US011178558B2

(12) United States Patent
Garg et al.

(10) Patent No.: US 11,178,558 B2
(45) Date of Patent: Nov. 16, 2021

(54) WIRELESS BACKHAUL RESILIENCY

(71) Applicant: Parallel Wireless, Inc., Nashua, NH (US)

(72) Inventors: Sumit Garg, Hudson, MA (US); Steven Paul Papa, Windham, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/162,593

(22) Filed: May 23, 2016

(65) Prior Publication Data

US 2016/0345192 A1 Nov. 24, 2016

Related U.S. Application Data

(60) Provisional application No. 62/165,458, filed on May 22, 2015.

(51) Int. Cl.

| H04W 24/04 | (2009.01) |
| H04L 12/28 | (2006.01) |
| H04J 11/00 | (2006.01) |
| H04W 76/22 | (2018.01) |
| H04B 1/74 | (2006.01) |

(Continued)

(52) U.S. Cl.
CPC ............ *H04W 24/04* (2013.01); *H04B 1/745* (2013.01); *H04J 11/00* (2013.01); *H04L 12/2854* (2013.01); *H04W 76/22* (2018.02); H04W 40/24 (2013.01); H04W 84/12 (2013.01); H04W 88/08 (2013.01)

(58) Field of Classification Search
None
See application file for complete search history.

(56) References Cited

U.S. PATENT DOCUMENTS 8,867,418 B2   10/2014   Mishra et al.
8,879,416 B2   11/2014   Mishra et al.
(Continued)

OTHER PUBLICATIONS

European Telecommunication Standards Institute, ETSI TS 136 423 v11.7.0 (Jan. 2014), "LTE; Evolved Universal Terrestrial Radio Access Network (E-UTRAN); X2 Application Protocol (X2AP) (3GPP TS 36.423 version 11.7.0 Release 11)," V11.7.0 Jan. 2014.

*Primary Examiner* — Gregory B Sefcheck
*Assistant Examiner* — Suk Jin Kang
(74) *Attorney, Agent, or Firm* — Michael Y. Saji; David W. Rouille

(57) ABSTRACT

A wireless backhaul resiliency system incorporating a mesh network is disclosed, comprising: a first base station utilizing a first mesh network node for a first wide area network (WAN)/backhaul connection and having a first wireless mesh functionality; and a second base station utilizing a second mesh network node for a second WAN/backhaul connection and having a second wireless mesh functionality, wherein the first base station is configured to detect when the first WAN/backhaul connection fails and fail over to a wireless mesh connection between the first wireless mesh functionality at the first base station and the second wireless mesh functionality at the second base station, thereby forwarding data from the first base station to a core network via the wireless mesh connection, the second mesh network node, and the second WAN/backhaul connection in the event of a failure.

19 Claims, 5 Drawing Sheets

(51) Int. Cl.
*H04W 88/08* (2009.01)
*H04W 84/12* (2009.01)
*H04W 40/24* (2009.01)

(56) References Cited

U.S. PATENT DOCUMENTS

| | | | |
|---|---|---|---|
| 9,048,979 B2 | 6/2015 | Park | |
| 9,078,286 B1* | 7/2015 | Yuan | H04W 88/085 |
| 9,113,352 B2 | 8/2015 | Agarwal et al. | |
| 9,820,309 B2* | 11/2017 | Masini | H04W 76/10 |
| 9,907,099 B2* | 2/2018 | Masini | H04B 7/14 |
| 2006/0083186 A1* | 4/2006 | Handforth | H04W 88/085 |
| | | | 370/310 |
| 2007/0030809 A1* | 2/2007 | Dayama | H04W 28/08 |
| | | | 370/237 |
| 2007/0155375 A1* | 7/2007 | Kappel | H04W 24/04 |
| | | | 455/422.1 |
| 2007/0264971 A1* | 11/2007 | Blankenship | H04L 45/00 |
| | | | 455/406 |
| 2008/0107034 A1 | 5/2008 | Jetcheva et al. | |
| 2008/0171569 A1* | 7/2008 | Pralle | H04B 1/74 |
| | | | 455/525 |
| 2008/0304485 A1 | 12/2008 | Sinha et al. | |
| 2009/0147690 A1* | 6/2009 | King | H04L 45/22 |
| | | | 370/245 |
| 2010/0159991 A1 | 6/2010 | Fu et al. | |
| 2010/0227603 A1* | 9/2010 | Gupta | H04W 24/02 |
| | | | 455/418 |
| 2012/0063419 A1* | 3/2012 | Zhao | H04W 24/04 |
| | | | 370/331 |
| 2012/0236708 A1* | 9/2012 | Kompella | H04W 24/04 |
| | | | 370/220 |
| 2012/0236823 A1* | 9/2012 | Kompella | H04W 24/04 |
| | | | 370/331 |
| 2012/0239966 A1* | 9/2012 | Kompella | H04W 24/04 |
| | | | 714/4.11 |
| 2013/0088983 A1* | 4/2013 | Pragada | H04W 16/14 |
| | | | 370/252 |
| 2013/0229910 A1* | 9/2013 | McKnight, Jr. | H04W 24/04 |
| | | | 370/218 |
| 2013/0310025 A1* | 11/2013 | Black | H04W 24/04 |
| | | | 455/423 |
| 2013/0336289 A1* | 12/2013 | Koifman | H04W 36/22 |
| | | | 370/331 |
| 2014/0086120 A1 | 3/2014 | Mishra et al. | |
| 2014/0092765 A1 | 4/2014 | Agarwal et al. | |
| 2014/0126356 A1* | 5/2014 | Lee | H04L 41/0663 |
| | | | 370/228 |
| 2014/0133456 A1 | 5/2014 | Donepudi et al. | |
| 2014/0185531 A1* | 7/2014 | Liu | H04L 45/125 |
| | | | 370/329 |
| 2014/0206368 A1* | 7/2014 | Maltsev | H04W 72/0406 |
| | | | 455/450 |
| 2014/0301360 A1* | 10/2014 | Bontu | H04W 16/32 |
| | | | 370/331 |
| 2015/0045063 A1 | 2/2015 | Mishra et al. | |
| 2015/0078167 A1 | 3/2015 | Papa et al. | |
| 2015/0085760 A1* | 3/2015 | Yamada | H04W 24/10 |
| | | | 370/329 |
| 2015/0109943 A1* | 4/2015 | Sahin | H04W 24/02 |
| | | | 370/252 |
| 2015/0181455 A1* | 6/2015 | Song | H04W 72/044 |
| | | | 455/452.1 |
| 2015/0181473 A1* | 6/2015 | Horn | H04W 36/0027 |
| | | | 370/331 |
| 2015/0215840 A1* | 7/2015 | Yiu | H04W 40/02 |
| | | | 370/329 |
| 2015/0223282 A1* | 8/2015 | Vajapeyam | H04W 76/18 |
| | | | 370/221 |
| 2015/0257051 A1 | 9/2015 | Rao et al. | |
| 2015/0312824 A1* | 10/2015 | Thalanany | H04W 60/00 |
| | | | 455/435.1 |
| 2015/0334764 A1* | 11/2015 | Rahman | H04W 76/025 |
| | | | 370/328 |
| 2015/0334765 A1* | 11/2015 | Rahman | H04W 76/025 |
| | | | 370/328 |
| 2015/0341835 A1* | 11/2015 | Bontu | H04W 36/32 |
| | | | 370/331 |
| 2015/0365954 A1* | 12/2015 | Levine | H04W 72/06 |
| | | | 455/450 |
| 2016/0007273 A1* | 1/2016 | Farid | H04W 48/16 |
| | | | 370/329 |
| 2016/0037401 A1* | 2/2016 | Lee | H04W 36/0055 |
| | | | 370/331 |
| 2016/0050577 A1 | 2/2016 | Rao et al. | |
| 2016/0057658 A1* | 2/2016 | Horn | H04L 43/16 |
| | | | 370/236 |
| 2016/0057687 A1* | 2/2016 | Horn | H04W 24/10 |
| | | | 370/331 |
| 2016/0088534 A1* | 3/2016 | Axmon | H04W 36/0083 |
| | | | 370/252 |
| 2016/0135103 A1* | 5/2016 | Lee | H04W 28/08 |
| | | | 455/444 |
| 2016/0143084 A1* | 5/2016 | Liao | H04W 36/08 |
| | | | 370/225 |
| 2016/0165499 A1* | 6/2016 | Xu | H04W 36/02 |
| | | | 370/331 |
| 2016/0205580 A1* | 7/2016 | Pragada | H04W 16/14 |
| | | | 370/252 |
| 2016/0212775 A1* | 7/2016 | Xu | H04W 76/10 |
| 2016/0242080 A1* | 8/2016 | Vikberg | H04W 36/0027 |
| 2016/0242226 A1* | 8/2016 | Fushiki | H04W 24/04 |
| 2016/0286449 A1* | 9/2016 | Choi | H04W 36/28 |
| 2016/0295449 A1* | 10/2016 | Seenappa | H04W 28/0236 |
| 2016/0295462 A1* | 10/2016 | Lunden | H04W 36/0055 |
| 2016/0295614 A1* | 10/2016 | Lee | H04W 48/08 |
| 2016/0308755 A1 | 10/2016 | Garg | |
| 2016/0337916 A1* | 11/2016 | Deenoo | H04W 8/22 |
| 2016/0337925 A1* | 11/2016 | Fujishiro | H04W 16/32 |
| 2016/0373972 A1* | 12/2016 | Vesely | H04W 28/08 |
| 2017/0012751 A1* | 1/2017 | Leroux | H04L 5/0035 |
| 2017/0048912 A1* | 2/2017 | Sharma | H04L 43/00 |
| 2017/0055170 A1* | 2/2017 | Futaki | H04W 24/08 |
| 2017/0070923 A1* | 3/2017 | Li | H04W 36/0066 |
| 2017/0071023 A1* | 3/2017 | Kunz | H04W 36/28 |
| 2017/0078940 A1* | 3/2017 | Zhang | H04W 36/0055 |
| 2017/0171771 A1* | 6/2017 | Jung | H04W 24/10 |
| 2017/0208501 A1* | 7/2017 | Lee | H04W 28/085 |
| 2017/0223763 A1* | 8/2017 | Rahman | H04W 76/025 |
| 2017/0231019 A1* | 8/2017 | Xu | H04W 76/02 |
| 2017/0367000 A1* | 12/2017 | Pragada | H04W 36/0083 |
| 2017/0374589 A1* | 12/2017 | Sang | H04W 16/32 |
| 2018/0007536 A1* | 1/2018 | Xu | H04W 8/082 |
| 2018/0035339 A1* | 2/2018 | Mitsui | H04W 36/08 |
| 2018/0049098 A1* | 2/2018 | Ueda | H04W 76/00 |
| 2018/0092116 A1* | 3/2018 | Pietraski | H04W 72/1289 |
| 2020/0068395 A1* | 2/2020 | Ingale | H04L 5/0048 |

* cited by examiner

WIRELESS BACKHAUL RESILIENCY

CROSS-REFERENCE TO RELATED APPLICATIONS

This application claims the benefit of priority under 35 U.S.C. §119(e) of U.S. Provisional Patent Application No. 62/165,458, having attorney docket no. PWS-71828US00, filed on May 22, 2015 and entitled "Wireless Backhaul Resiliency," which is hereby incorporated by reference in its entirety for all purposes. The present application also hereby incorporates by reference U.S. patent application Ser. No. 13/889,631, "Heterogeneous Mesh Network and a Multi-RAT Node Used Therein," filed May 8, 2013, having attorney docket no. PWS-71700US01; U.S. patent application Ser. No. 14/024,717, "Heterogeneous Self-Organizing Network for Access and Backhaul," filed Sep. 12, 2013, having attorney docket no. PWS-71700US02; U.S. patent application Ser. No. 14/183,176, "Methods of incorporating an Ad Hoc Cellular Network into a Fixed Cellular Network," filed Feb. 18, 2014, having attorney docket no. PWS-71710US01; U.S. patent application Ser. No. 14/642,544, "Federated X2 Gateway," filed Mar. 9, 2015, having attorney docket no. PWS-71756US01; U.S. patent application Ser. No. 14/828,432, "Inter-Cell Interference Mitigation," filed Aug. 17, 2015, having attorney docket no. PWS-71771US01; and U.S. patent application Ser. No. 15/132,229, "MaxMesh: Mesh Backhaul Routing," filed Apr. 18, 2016, having attorney docket no. PWS-71820US01, each in its entirety for all purposes. Additionally, U.S. Pat. App. Pub. Nos. US20140086120, US20140092765, US20140133456, US20150045063, and US20150078167 are hereby incorporated by reference in their entirety for all purposes.

BACKGROUND

With the proliferation of mobile devices, a mobile network is dependent on its backhaul, or connection to a core network. Currently, macro base stations provide backhaul to attached base stations via wired or wireless links to upstream nodes. Improving the resiliency of this backhaul is therefore desirable and useful. Specifically, macro base stations typically obtain backhaul via a wired network connection, such as an optical fiber or coaxial connection to a local Internet point of presence (POP). This network connection is routed through the infrastructure of the local Internet POP, which may include, without limitation, routers, switches, intermediary links, and other network infrastructure. The Internet POP provides Internet connectivity, which may be used to provide transport for communications to and from the mobile operator's core network, and/or dedicated connectivity to the mobile operator's core network.

In the event that a failure occurs at the local Internet POP, the macro base station will lose its connection to the core network. For example, if an adverse weather event results in flooding or destruction of the Internet POP's network infrastructure in a given city, the macro will lose its backhaul connection. However, it would be helpful for the macro base station to be enabled to connect to a secondary Internet POP via a secondary network link, for providing resilient backhaul infrastructure, i.e., backhaul that is resistant to service interruptions.

SUMMARY

In some embodiments, a macro base station is enabled to share a backhaul connection with another macro base station, using a wireless backhaul system incorporating a mesh network. A first macro base station utilizes a first mesh network node for its wide area network (WAN)/backhaul connection. A second macro base station also utilizes a second mesh network node for its own WAN/backhaul connection. If a failure occurs in the backhaul connection for the first macro base station, the first macro base station may cut over its backhaul connection to the backhaul connection of the second macro base station. Data to and from the backhaul connection may be forwarded from the first mesh network node to the second mesh network node, thereby providing a secondary backhaul connection.

In one embodiment, a wireless backhaul resiliency system incorporating a mesh network is disclosed, comprising: a first base station utilizing a first mesh network node for a first wide area network (WAN)/backhaul connection and having a first wireless mesh functionality; and a second base station utilizing a second mesh network node for a second WAN/backhaul connection and having a second wireless mesh functionality, wherein the first base station is configured to detect when the first WAN/backhaul connection fails and fail over to a wireless mesh connection between the first wireless mesh functionality at the first base station and the second wireless mesh functionality at the second base station, thereby forwarding data from the first base station to a core network via the wireless mesh connection, the second mesh network node, and the second WAN/backhaul connection in the event of a failure, and wherein the first WAN/backhaul connection is a wired connection.

The first base station may furthercomprise a routing functionality configured to install a route to the core network based on connectivity of a WAN/backhaul connection. The first and the second base stations may be Long Term Evolution (LTE) eNodeBs and the wireless mesh connection may be a Wi-Fi connection. The first mesh network node may be colocated with the first base station and the second mesh network node may be colocated with the second base station. The first WAN/backhaul connection and the second WAN/backhaul connection may be in communication with different network interconnection points for communication with the core network. The first and the second base stations may send and receive X2 protocol messages via the wireless mesh connection between the first wireless mesh functionality at the first base station and the second wireless mesh functionality at the second base station without transiting through the core network. The first and the second base station may each further comprise two or more radios for wireless mesh functionality. The first and the second base station may be wirelessly coupled to other mesh nodes in a ring topology. The first mesh network node may be configured to fail over to at least one wireless mesh connection based on an ordered pre-configured list of wireless mesh connections. The first mesh network node may be configured to fail over to the wireless mesh connection at the second mesh network node based on a geographic proximity between the first mesh network node and the second mesh network node. The wireless mesh connection may be at least one of an IEEE 802.11a/b/g/n/ac/ad/af/ah Wi-Fi connection, a microwave connection, a Long Term Evolution (LTE) connection, a wireless connection with a frequency between 5.0 and 6.0 GHz, a wireless connection with a frequency between 2.2 and 2.5 GHz, and a wireless connection with a frequency between 20 and 65 GHz.

In another embodiment, a method is disclosed, comprising: sending, from a Long Term Evolution (LTE) base station, data packets to a core network over a wired backhaul connection; identifying a failure of the wired backhaul connection at the LTE base station; setting up a wireless mesh network with another LTE base station; and re-routing data packets at the LTE base station to the core network via the wireless mesh network with the another LTE base station.

The method may further comprise detecting a reconnection of the wired backhaul connection at the LTE base station and re-routing data packets at the LTE base station to the core network via the wired backhaul connection. The wired backhaul connection and the another LTE base station may be in communication with different network interconnection points for communication with the core network. The LTE base station and the another LTE base station may send and receive X2 protocol messages between each other via the wireless mesh network. The LTE base station and the another LTE base station may be configured with two or more radios for wireless mesh functionality. The method may further comprise the LTE base station and the another LTE base station wirelessly coupling to other mesh nodes in a ring topology. The method may further comprise the LTE base station failing over to at least one wireless mesh connection based on an ordered pre-configured list of wireless mesh connections. The method may further comprise the LTE base station failing over to the another LTE base station based on a geographic proximity between the LTE base station and the another LTE base station. The wireless mesh network may be at least one of an IEEE 802.11a/b/g/n/ac/ad/af/ah Wi-Fi connection, a microwave connection, a Long Term Evolution (LTE) connection, a wireless connection with a frequency between 5.0 and 6.0 GHz, a wireless connection with a frequency between 2.2 and 2.5 GHz, and a wireless connection with a frequency between 20 and 65 GHz.

DETAILED DESCRIPTION

Figure 1:
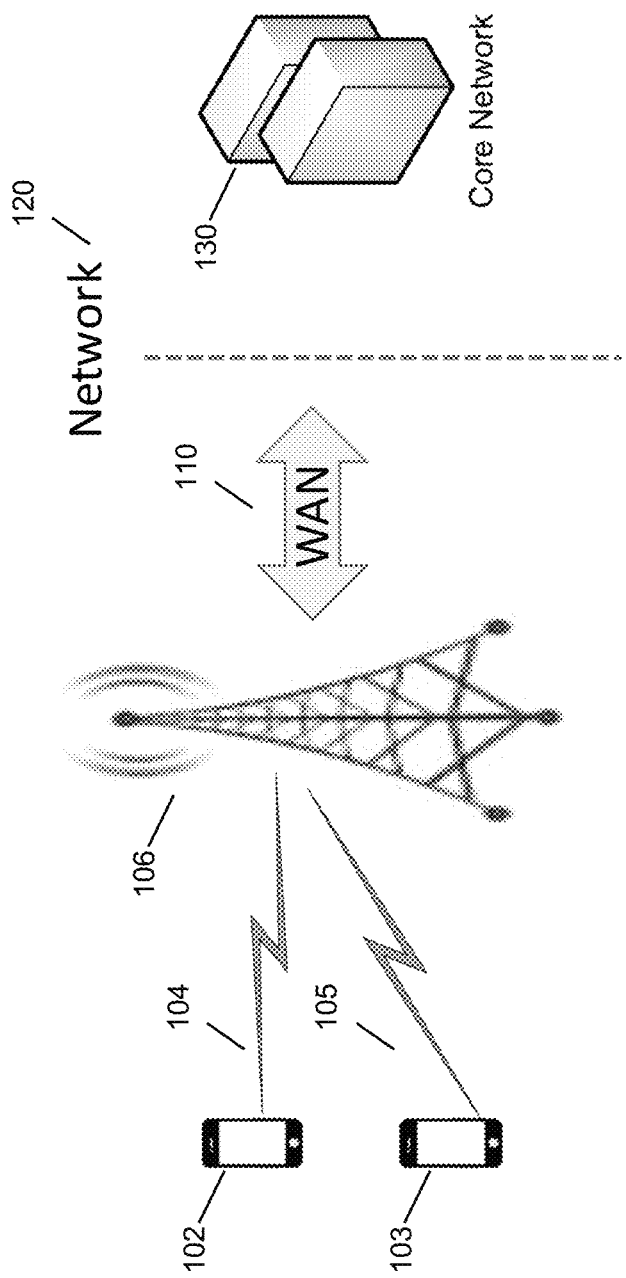
FIG. 1 is a schematic diagram of a prior art network configuration.

In current macro deployments, the backhaul interface is typically a wired network interface connecting the base station to the network, variously referred to herein as a wide area network (WAN) or operator network, with each base station having its own such wired backhaul connection using, e.g., a fiber optic or Ethernet connection. Secondary interfaces may also be set up as wired network interfaces in the same manner. However, it is expensive to set up and maintain multiple wired backhaul connections, with one being a backup or secondary interface. As well, a secondary interface will typically plug into the network at the same physical location, which may be a switch in a network closet connected to the WAN. When this interconnection point is the same as the primary interface, the secondary interface remains vulnerable to many of the issues that may cause network failure. For example, the network switch being used as the endpoint of the wired backhaul connection, or another network device in the chain of devices between the base station and the operator core network may fail or lose power. Since the secondary backhaul connection is connected to the same network device, the redundancy of the secondary interface is defeated by this type of network equipment fault.

A system is proposed wherein a wireless network is used to provide resilient backhaul for a radio tower or base station. A mesh network node, which may be a mesh base station or a multi-radio access technology (multi-RAT) node, may be situated in a network behind a cellular base station and in front of a core network. The mesh network nodes may provide backhaul capability for the cellular base station when a primary network link of the cellular base station fails. This approach handles localized outages on the WAN or connectivity for macro. Instead of using a single point of interconnection for the backhaul connection, the base station uses a wireless connection with a second base station, and shares the second base station's backhaul connection. The second base station is connected to the core network at a separate network interconnect. The secondary backhaul connection thus has the advantage of not being connected to the same secondary network link as the first macro cell. As an example, the second base station may be located in another city, and may utilize a different Internet service provider point-of-presence (ISP POP). This enables greater resiliency over the common case of having the secondary connection use the same interconnection point.

The wireless connection with the second base station may be enabled using a mesh network. Each base station may be equipped with a colocated mesh network node, and each mesh network node may be configured to connect to one or more other nodes in the mesh network via a wireless connection. The mesh network nodes may use their direct wireless links to enable communication between the base stations. For example, for two LTE eNodeBs, the wireless interface may be kept active and may be used for exchanging X2 protocol messages according to 3GPP specifications. Alternatively, the wireless interface may be brought up and down on an as-needed basis. The direct wireless links may also provide a secondary backhaul connection to be used when the primary backhaul connection fails.

In normal operation, user data may be received at the base station and may be transmitted via a wired backhaul interface to a first network interconnect for the first node, and to a second network interconnect for the second node. Once the first base station identifies a failure, the first base station activates the secondary wireless interface for backup operation. The mesh base station calculates updated routes, such as an updated default route that uses the wireless interface, and then directs traffic over the wireless interface. In many cases only minimal interruptions in service may occur. The mesh base station may continue to monitor the wired backhaul interface and may switch the default route back to it when it is reactivated.

Even if the wireless link is slightly degraded compared with the wired link, the link may be used to throttle services or to inform the core network that only limited service is available.

This approach has several advantages. The use of a mesh network, with point-to-point links, makes backup connectivity to the core network as simple as establishing another point-to-point wireless link. Multiple radios may be present on the mesh network node, and may enable the base station to select a particular mesh node to connect to for its secondary link based on various factors. The use of a different interconnection point in the network helps get around localized outages. As well, X2 flows can be enhanced by delivering the X2 messages over the direct wireless links, instead of sending an X2 message from a source base station to the core network for delivery back to the target base station. In some embodiments, X2 protocol messages may be routed over a shortest path.

These advantages may be obtained without significantly increasing latency, by utilizing a sufficiently fast processor for performing routing computation for sub-second routing convergence at a routing module in the mesh base station. In some embodiments, convergence may be configurable, and may be configured to be a value between 800 ms and 2 seconds, in some embodiments. In some embodiments no buffering beyond underlying protocol buffering may be used.

When multiple mesh nodes are available for establishment of a wireless interface, the establishment of the wireless interface can be based on received information about the status or load or active state of the wireless link endpoint. Alternatively, the mesh network node may be configured with a particular order of nodes to try, or the mesh network node may be configured to attempt to connect to a mesh network node outside of its immediate geographic vicinity using, e.g., stored global positioning system (GPS) coordinates.

The mesh network may use a Wi-Fi interface, such as a 2.4 GHz or 5.X GHz connection, or another wireless interface as described herein. The second base station's backhaul connection may be wired or wireless. The mesh base stations may be part of the same physical device as the base stations, which may be LTE eNodeBs or UMTS nodeBs. The mesh network nodes may include a routing module, for sending traffic to either a wireless interface or a wired backhaul connection, and an interface monitoring module, for detecting when a particular connection, such as a wired backhaul connection, goes down or comes back up. Colocation has the advantage that additional points of failure are not introduced into the system.

In some embodiments, the mesh network may involve nodes that are not colocated with the base stations but instead are connected via a WAN interface, via Ethernet or fiber or another wired interface with one or more base stations, as shown. In some embodiments, a mesh network may not be needed and a single wireless interface may be established between two dedicated network nodes. In some embodiments, an eNodeB or other base station may connect to a device specifically configured to activate a wireless mesh link, and the base station may provide the routing capability needed to switch between the mesh link and a wired backhaul link.

In some embodiments a plurality of base stations may be equipped with the mesh network nodes. It is understood that each mesh node adds to the resiliency of the system. In some embodiments a mesh network node or nodes may be equipped with a plurality of radio interfaces. In some embodiments, the mesh nodes may be connected in various topologies. For example, the mesh base stations may have two wireless interfaces, enabling them to form a ring topology with other similarly-equipped mesh base stations, or three wireless interfaces, configured to form a more complex topology. In some embodiments at least two wireless radios per mesh node may be used. Multiple links to peers may be used for both resiliency and reduced X2 interface latency, useful for inter-cell interference cancellation (ICIC).

Modules as described herein may be software routines or hardware devices, or hardware configured with software, or both. Wireless interfaces as described herein may be IEEE 802.11a/b/g/n/ac/ad/af/ah, microwave, 5.4 GHz, 5.8 GHz, 2.3 GHz, 2.4 GHz, 2.6 GHz, 3.5 GHz, 20 GHz, 60 GHz, television whitespace (TVWS), the international industrial, scientific and medical (ISM) frequency bands, licensed or non-licensed bands, non-line of sight or near-line of sight, line-of-sight, or another type of wireless interface. An LTE network interface and/or UMTS network interface may be used as the wireless interface, in some embodiments. An appropriate frequency could be identified based on the characteristics of that geographic location, either via central planning or using a radio sniffing capability at the mesh base station.

Assuming that a 5.8 GHz band is used, with an output gain of 36 dBm equivalent isotropically radiated power (EIRP) and an antenna gain from 18 to 25, peak modulation and throughput for 40 MHz of bandwidth is achievable at a distance of between 4.6 and 23.1 km. Adding a 5 dB padding factor to compensate for weather and/or fading results in a reduction in distance of roughly half. 200 Mbps of data throughput would be available using such a wireless interface, which would be more than sufficient for backhauling a typical base station, which can use from 30-35 Mbps in some use caes.

In some embodiments, a base station may connect to multiple peers for both increasing resiliency and reducing X2 interface latency, thereby improving performance of X2 for providing inter-cell interference cancellation (ICIC). The base station may include edge router functionality.

In some embodiments, synchronization hardware may be included in the mesh nodes/multi-RAT base stations. The nodes may then be able to synchronize with each other to attain a high degree of synchronization. Current synchronization solutions use Global Positioning System (GPS) or IEEE 1588 Precision Time Protocol (PTP) technologies to provide synchronization at or above the sync requirements of 3GPP technologies, e.g., LTE or UMTS. However, PTP requires a low-latency connection to a time server, which could be severed in case of a link failure, and GPS requires line-of-sight to GPS satellites and cannot be used indoors, as well as being sensitive to jamming. The inclusion of other synchronization hardware may provide the required synchronization capability necessary to support LTE communications. An example of such synchronization hardware is found at, e.g., U.S. Pat. No. 9,048,979, which is hereby incorporated by reference herein in its entirety for all purposes.

FIG. 1 is a schematic diagram of a prior art network configuration. Mobile devices 102 and 103, which may be Long Term Evolution (LTE) user equipments (UEs), are connected via wireless connections 104 and 105 to a base station 106. Base station 106 may be a macro cell and may provide wireless access to a large number of wireless users, requiring a significant amount of bandwidth to backhaul the data from the users to the core network. The data to and from the wireless users may be transferred across wide area network (WAN) connection 110 and network 120 to core network 130. In some cases network 120 may be a wireless operator network, and in other cases may include the public Internet. Core network 130 includes network elements used to provide services to the wireless users, via base station 106. WAN connection 110 is required in order to provide service, and when it fails, no secondary backhaul network is available. In alternate scenarios, WAN connection 110 may include several wired network connections, but as they all transit through network 120 at a single network interconnection point (not shown), base station 106 is still vulnerable to attack or disruption of service.

Figure 2:
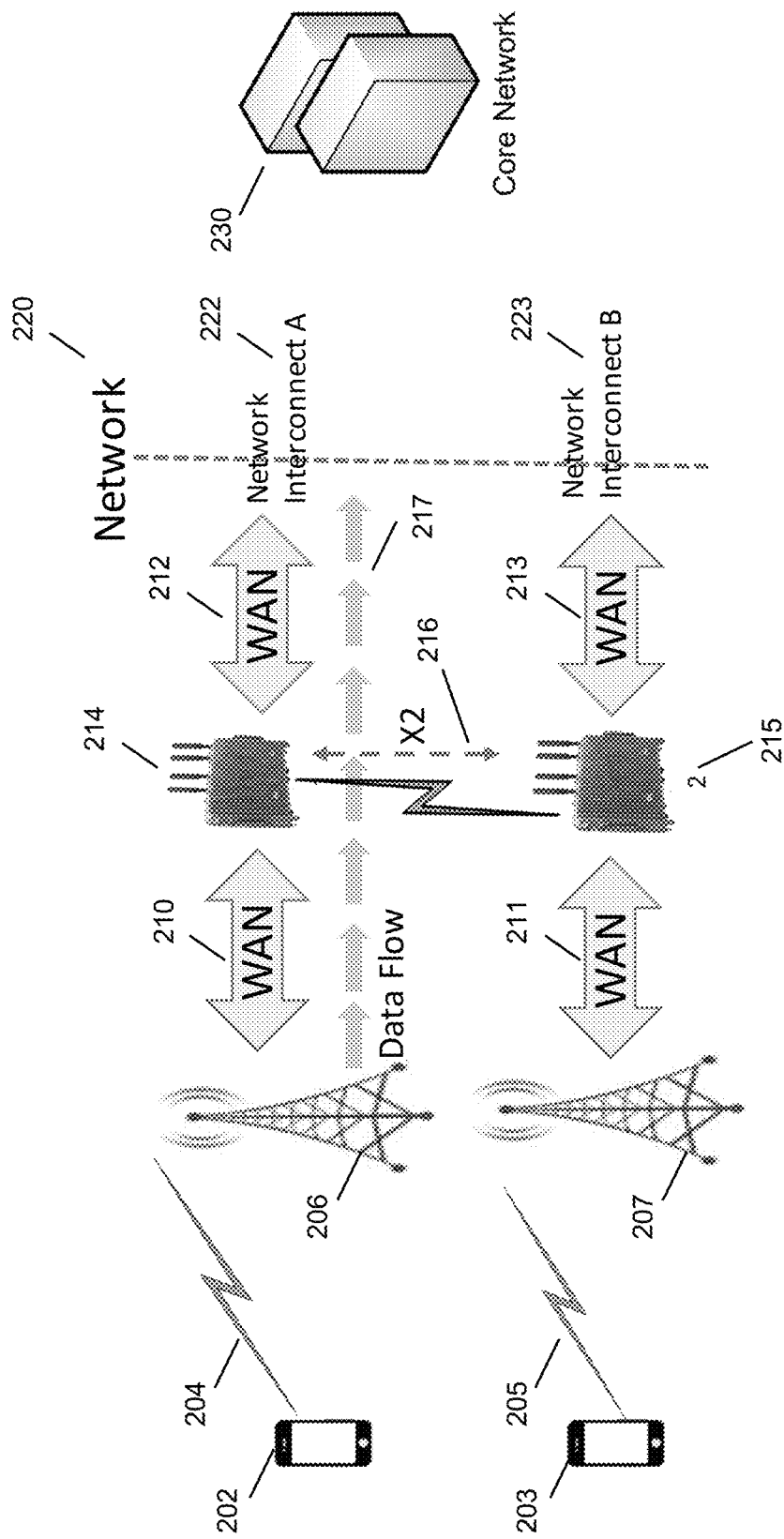
FIG. 2 is a schematic diagram of a resilient wireless network, in accordance with some embodiments.

FIG. 2 is a schematic diagram of a resilient wireless network, in accordance with some embodiments. UEs 203 and 204 connect to base stations 206 and 207 using wireless connections, such as LTE wireless connections. Base stations 206 and 207 are in communication via WAN connections 210 and 211, respectively, to mesh network nodes 214 and 216. Mesh network nodes 214 and 216 are in communication via WAN connections 212 and 213, respectively, to network interconnect 222 and network interconnect 223, respectively. Network interconnects 222 and 223 are part of but separate from network 220 and are in communication with core network 230. In some embodiments in which mesh nodes 214 and 215 are colocated with base stations 206 and 207, WAN interfaces 210 and 211 may be omitted.

In normal operation, UE 202 can complete a call via core network 230 to UE 203. Data for the call flows according to arrows 217 via base station 206, WAN connection 210, mesh base station 214, WAN connection 212, and network interconnect 222 to core network 230, after which call accounting is performed and a call is completed with UE 203 via network interconnect 223, WAN connection 213, mesh node 215, WAN connection 211, base station 207 and wireless connection 205.

Further, mesh nodes 214 and 216 are in direct communication via a wireless link between the two nodes. The WAN connections 210, 212, 211, 213 shown are higher bandwidth fixed lines and are considered the primary backhaul links for base stations 206 and 207. Connection 216 between mesh nodes 214 and 215 may be brought up and down as needed but is not necessary for operation of the cells. X2 communications may be sent and received via link 216. These X2 communications are communications according to the 3GPP X2 protocol between base stations 206 and 207, for example, for performing inter-cell interference coordination (ICIC) or handover data redirection. Core network 230 need not be part of the X2 communications because a direct link is available between mesh nodes 214 and 215.

Figure 3:
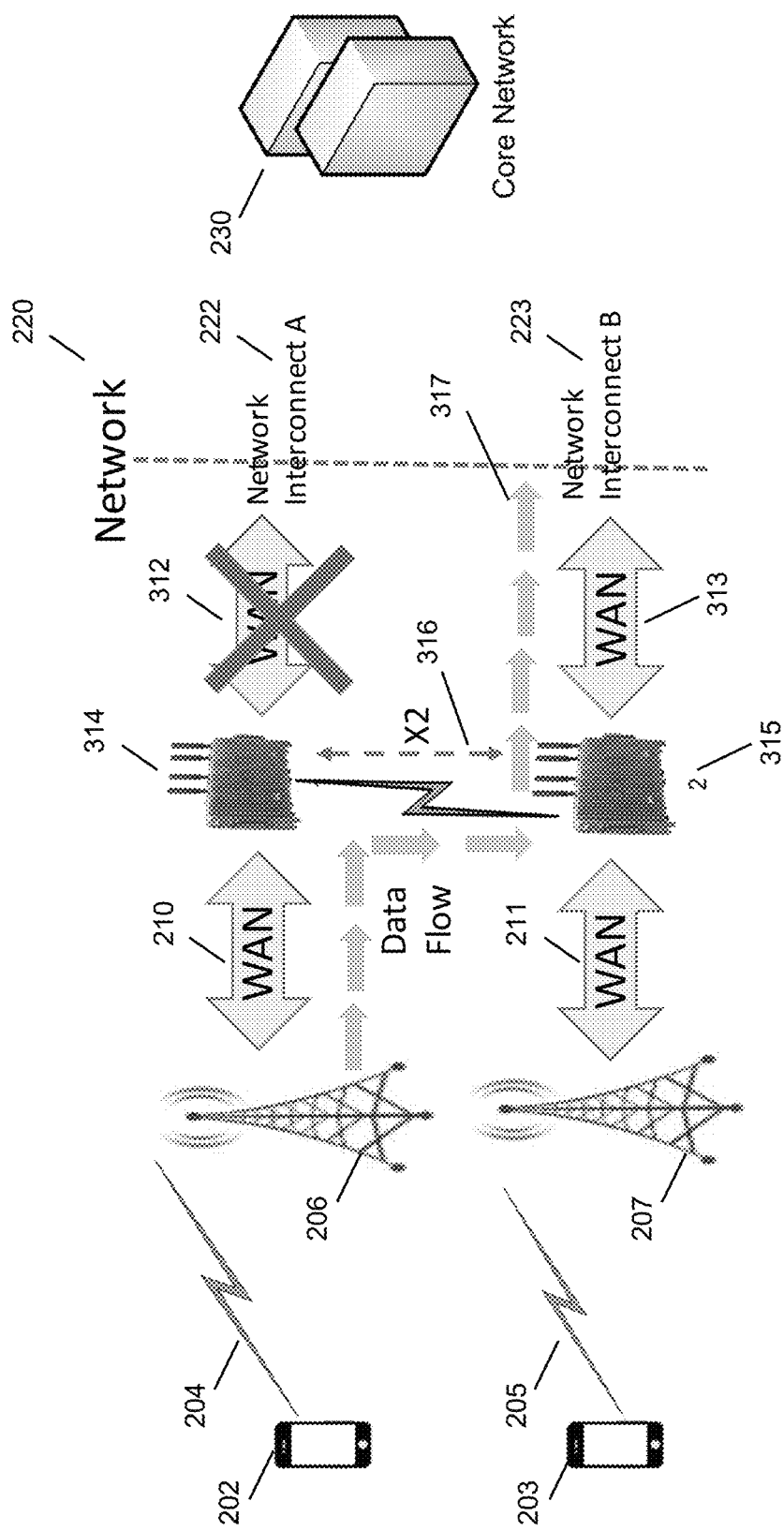
FIG. 3 is a further schematic diagram of a resilient wireless network, in accordance with some embodiments.

FIG. 3 is a further schematic diagram of a resilient wireless network, in accordance with some embodiments. FIG. 3 shows a state of the wireless network of FIG. 2 after a network fault has occurred at WAN connection 312. This may have been, for example, due to a physical cable being severed, or due to an electrical fault, or due to a component failure at network interconnect 222. However, mesh node 314 identifies that WAN connection 312 is not available, and reroutes data according to arrows 317 across wireless connection 316 to mesh node 315. If wireless connection 316 is not available, mesh node 314 may direct mesh node 315 to activate the connection. The failover is transparent to UEs 202 and 203, as well as to base stations 206 and 207.

Figure 5:
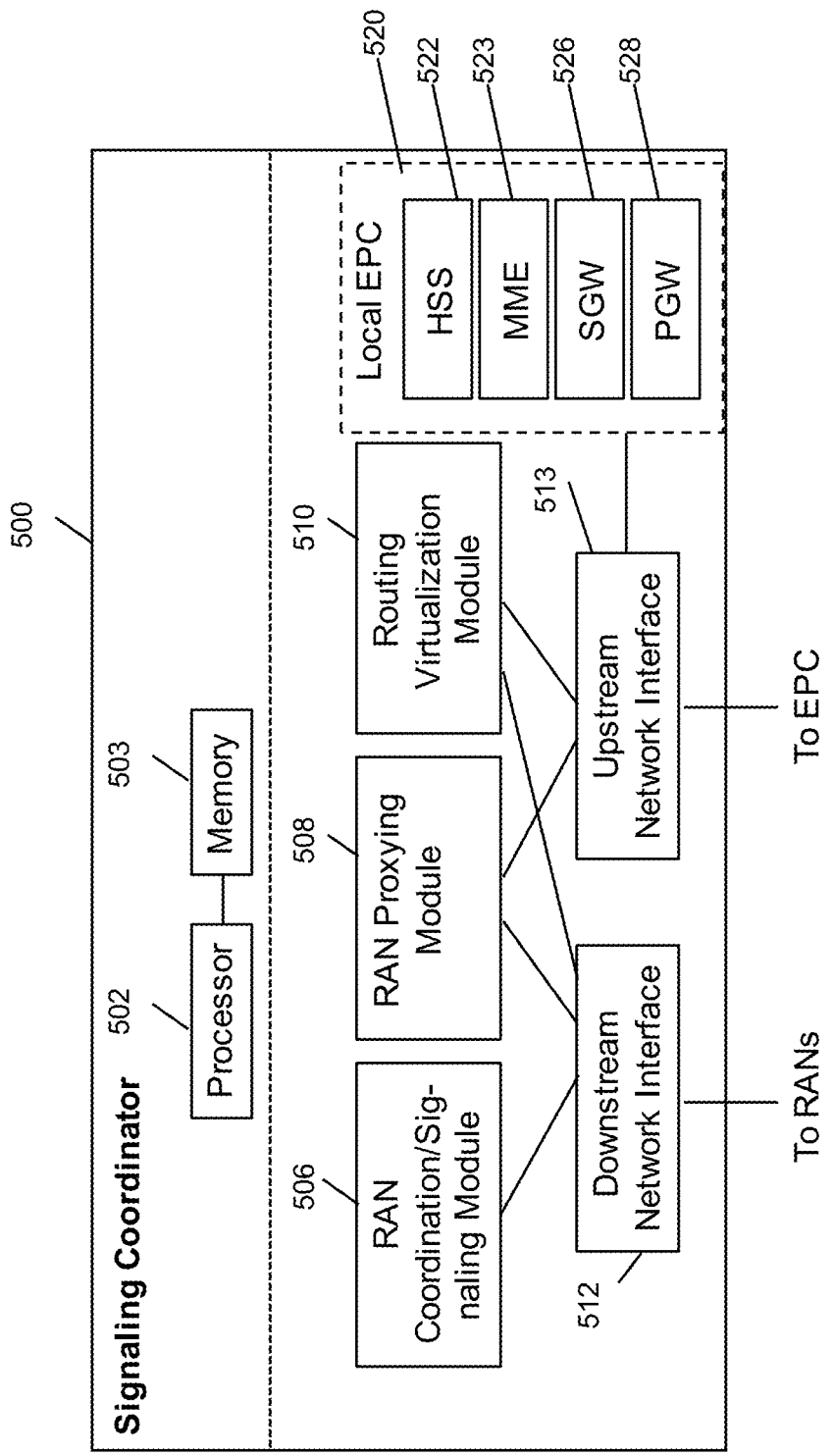
FIG. 5 is a schematic diagram of a signaling coordinator, in accordance with some embodiments.

Mesh node 314 may select from one or more wireless connections, in some embodiments, based on its configuration parameters and in some cases based on observed or measured information about the quality of links to other nodes in the mesh. Mesh node 314 may perform routing and/or identification of a suitable mesh node in conjunction with mesh node 315, another mesh node, or with core network 230 (in cases when connectivity is still available), such as with a core network node 500 as shown in FIG. 5. Configuration for mesh node 314 and for failover procedures may be sent to mesh node 314 from core network 230, including from core network node 500. Configuration may include routing rules, failover time thresholds, network interface polling times, preconfigured latencies and other route information for different wireless mesh links, information about network functionalities (e.g., frequencies and wireless protocols) supported by particular mesh nodes, and any other networking, routing, or operational instructions and data. Mesh node 315 may also be reconfigured to redirect data flow 317 to core network 230. In some embodiments no reconfiguration of mesh node 315 may be necessary (for example, if mesh node 315 is configured indicating WAN connection 313 as the default route).

As shown in FIG. 3, wireless interface 316 is now being used for backhaul by both base station 206 and base station 207. Calls to and from UE 202 go to the core network 230 via mesh node 315, WAN connection 313, and network interconnect 223. Calls to and from UE 203 also go along at least part of the same route, namely, mesh node 315 and WAN connection 313. X2 messages continue to be sent along wireless link 316, in addition to all backhauled data from base station 206.

At a later time, if WAN connection 312 comes back up, mesh noe 314 may detect that the connection is now available and may reactivate that link and may optionally also deactivate wireless link 316.

Figure 4:
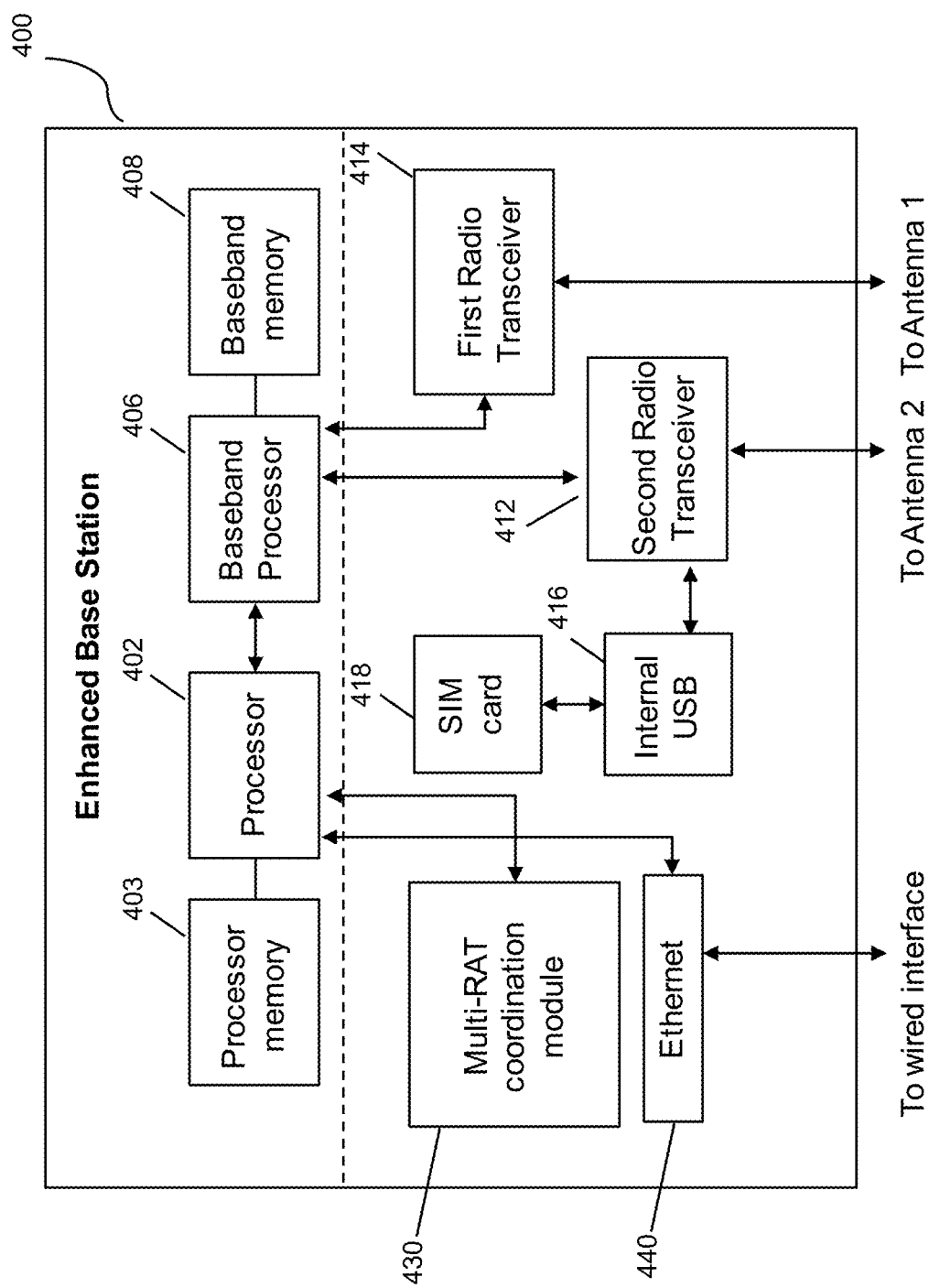
FIG. 4 is a schematic diagram of an enhanced mesh base station, in accordance with some embodiments.

FIG. 4 is a schematic diagram of an enhanced base station, in accordance with some embodiments. Enhanced base station 400 may be an eNodeB for use with LTE, and may include processor 402, processor memory 404 in communication with the processor, baseband processor 406, and baseband processor memory 408 in communication with the baseband processor. Enhanced eNodeB 400 may also include first radio transceiver 410 and second radio transceiver 412, internal universal serial bus (USB) port 416, and subscriber information module card (SIM card) 418 coupled to USB port 414. In some embodiments, the second radio transceiver 412 itself may be coupled to USB port 416, and communications from the baseband processor may be passed through USB port 416.

Processor 402 and baseband processor 406 are in communication with one another. Processor 402 may perform routing functions, and may determine if/when a switch in network configuration is needed, such as when a prior network interface or network route to a core network becomes disabled and a new mesh network interface should be configured as a default route. Baseband processor 406 may generate and receive radio signals for both radio transceivers 410 and 412, based on instructions from processor 402. In some embodiments, processors 402 and 406 may be on the same physical logic board. In other embodiments, they may be on separate logic boards. In some embodiments, a wired network interface may also be provided, shown as Ethernet module 440. The wired interface may be used for connection to a co-located base station, in some embodiments, or the co-located base station may be provided as part of base station 400. The wired interface may be used for connection to a core network via a fiber optic or Ethernet WAN connection, in some embodiments.

The first radio transceiver 410 may be a radio transceiver capable of providing LTE eNodeB functionality, and may be capable of higher power and multi-channel OFDMA. The second radio transceiver 412 may be a radio transceiver capable of providing LTE UE functionality. Both transceivers 410 and 412 are capable of receiving and transmitting on one or more LTE bands. In some embodiments, either or both of transceivers 410 and 412 may be capable of providing both LTE eNodeB and LTE UE functionality. Transceiver 410 may be coupled to processor 402 via a Peripheral Component Interconnect-Express (PCI-E) bus, and/or via a daughtercard. As transceiver 412 is for providing LTE UE functionality, in effect emulating a user equipment, it may be connected via the same or different PCI-E bus, or by a USB bus, and may also be coupled to SIM card 418.

SIM card 418 may provide information required for authenticating the simulated UE to the evolved packet core (EPC). When no access to an operator EPC is available, local EPC 420 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul, or both, may be used either as primary or secondary. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 410 and 412, which may be Wi-Fi 402.11a/b/g/n/ac/ad/ ah, Bluetooth, ZigBee, microwave (including line-of-sight microwave), or another wireless backhaul connection. Any of the wired and wireless connections may be used for either access or backhaul, according to identified network conditions and needs, and may be under the control of processor 402 for reconfiguration. The wireless interface may be used to create a mesh network with other base stations, including for the purpose of providing a wireless backhaul connection as described herein.

Other elements and/or modules may also be included, such as a home eNodeB, a local gateway (LGW), a self-organizing network (SON) module, or another module. Additional radio amplifiers, radio transceivers and/or wired network connections may also be included. The SON module may be configured to provide transmit power increase/decrease functionality, radio band switching functionality, or communications with another remote SON module providing, for example, these types of functionality, in some embodiments. The SON module may be used to perform the steps described herein and may execute on the general purpose processor 402.

Processor 402 may identify the appropriate network configuration, and may perform routing of packets from one network interface to another accordingly. Processor 402 may use memory 404, in particular to store a routing table and/or routing rules to be used for routing packets. Baseband processor 406 may perform operations to generate the radio frequency signals for transmission or retransmission by both transceivers 410 and 412. Baseband processor 406 may also perform operations to decode signals received by transceivers 410 and 412. Baseband processor 406 may use memory 408 to perform these tasks.

FIG. 5 is a schematic diagram of a signaling coordinator server, in accordance with some embodiments. Signaling coordinator 500 includes processor 502 and memory 504, which are configured to provide the functions described herein. Also present are radio access network coordination/signaling (RAN Coordination and signaling) module 506, RAN proxying module 508, and routing virtualization module 510. In some embodiments, coordinator server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet). Signaling storm reduction functions may be performed in module 506.

Signaling coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 5G/2G, legacy TDD, or other air interfaces used for mobile telephony. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the Wi-Fi frequency bands described herein may be channels determined by the respective IEEE 802.11 protocols, which are incorporated herein to the maximum extent permitted by law. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

Those skilled in the art will recognize that multiple hardware and software configurations may be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention may be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

Although the scenarios for interference mitigation are described in relation to macro cells and micro cells, or for a pair of small cells or pair of macro cells, the same techniques may be used for reducing interference between any two cells, in which a set of cells is required to perform the CoMP methods described herein. The applicability of the above techniques to one-sided deployments makes them particularly suitable for heterogeneous networks, including heterogeneous mesh networks, in which all network nodes are not identically provisioned.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods may be combined. In the scenarios where multiple embodiments are described, the methods may be combined in sequential order, in various orders as necessary.

Although certain of the above systems and methods for providing interference mitigation are described in reference to the Long Term Evolution (LTE) standard, one of skill in the art would understand that these systems and methods may be adapted for use with other wireless standards or versions thereof.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A wireless backhaul resiliency system incorporating a mesh network, comprising:
    a first base station utilizing a first mesh network node for a first wide area network (WAN)/backhaul connection and having a first wireless mesh functionality; and
    a second base station utilizing a second mesh network node for a second WAN/backhaul connection and having a second wireless mesh functionality,
    wherein the first base station is configured to detect when the first WAN/backhaul connection fails and fail over to a wireless mesh connection between the first wireless mesh functionality at the first base station and the second wireless mesh functionality at the second base station, thereby forwarding data from the first base station to a core network via the wireless mesh connection between the first mesh network node and the second mesh network node and the second WAN/backhaul connection in the event of a failure, and wherein when a wireless mesh connection between the first mesh network node and the second mesh network node is not available, then the first mesh network node directs the second mesh network node to activate the wireless mesh connection between the first mesh network node and the second mesh network node and to use this wireless mesh connection between the first mesh network node and the second mesh network node for backhaul by both of the first base station and the second base station in addition to messages between the first mesh node and the second mesh node;
    wherein the first WAN/backhaul connection is a connection between the first mesh network node and a first physical network interconnect, the first physical network interconnect being in communication with the core network,
    wherein the second WAN/backhaul connection is a connection between the second mesh network node and a second physical network interconnect, the second physical network interconnect being in communication with the core network and separate from the first physical network interconnect, the second physical network interconnect not being in a data path from the first base station to the core network via the first physical network interconnect; and
    wherein the first mesh network node is configured to fail over to at least one wireless mesh connection based on an ordered pre-configured list of wireless mesh connections.

2. The system of claim 1, wherein the first base station further comprises a routing functionality configured to install a route to the core network based on connectivity of a WAN/backhaul connection.

3. The system of claim 1, wherein the first and the second base stations are Long Term Evolution (LTE) eNodeBs and wherein the wireless mesh connection is a Wi-Fi connection.

4. The system of claim 1, wherein the first mesh network node is colocated with the first base station and wherein the second mesh network node is colocated with the second base station.

5. The system of claim 1, wherein the first and the second base stations send and receive X2 protocol messages via the wireless mesh connection between the first wireless mesh functionality at the first base station and the second wireless mesh functionality at the second base station without transiting through the core network.

6. The system of claim 1, wherein the first and the second base station each further comprise two or more radios for wireless mesh functionality.

7. The system of claim 1, wherein the first and the second base station are wirelessly coupled to other mesh nodes in a ring topology.

8. The system of claim 1, wherein the wireless mesh connection is at least one of an IEEE 802.11a/b/g/n/ac/ad/af/ah Wi-Fi connection, a microwave connection, a Long Term Evolution (LTE) connection, a wireless connection with a frequency between 5.0 and 6.0 GHz, a wireless connection with a frequency between 2.2 and 2.5 GHz, and a wireless connection with a frequency between 20 and 65 GHz.

9. The wireless backhaul resiliency system of claim 1 wherein the base station comprises a multi-radio access technology (multi-RAT) node.

10. A method, comprising:
sending, from a first Long Term Evolution (LTE) base station, data packets to a core network over a first backhaul connection;
identifying a failure of the first backhaul connection at the first LTE base station;
setting up a wireless mesh network, at the first LTE base station, with a second LTE base station; and
re-routing data packets at the first LTE base station to the core network via the wireless mesh network with the second LTE base station over a second backhaul connection, and wherein when a wireless mesh connection between the first mesh network node and the second mesh network node is not available, then the first mesh network node directs the second mesh network node to activate the wireless mesh connection between the first mesh network node and the second mesh network node and to use this wireless mesh connection between the first mesh network node and the second mesh network node for backhaul by both of the first base station and the second base station in addition to messages between the first mesh node and the second mesh node;
wherein the first backhaul connection is a connection between the first mesh network node and a first physical network interconnect, the first physical network interconnect being in communication with the core network,
wherein the second backhaul connection is a connection between the second mesh network node and a second physical network interconnect, the second physical network interconnect being in communication with the core network and separate from the first physical network interconnect, the second physical network interconnect not being in a data path from the first LTE base station to the core network via the first physical network interconnect; and
the first LTE base station failing over to at least one wireless mesh connection based on an ordered pre-configured list of wireless mesh connections.

11. The method of claim 10, further comprising detecting a reconnection of the first backhaul connection at the first LTE base station and re-routing data packets at the first LTE base station to the core network via the first backhaul connection.

12. The method of claim 10, wherein the first LTE base station and the second LTE base station send and receive X2 protocol messages between each other via the wireless mesh network.

13. The method of claim 10, wherein the first LTE base station and the second LTE base station are configured with two or more radios for wireless mesh functionality.

14. The method of claim 10, further comprising the first LTE base station and the second LTE base station wirelessly coupling to other mesh nodes in a ring topology.

15. The method of claim 10, further comprising the first LTE base station failing over to the second LTE base station based on a geographic proximity between the first LTE base station and the second LTE base station.

16. The method of claim 10, wherein the wireless mesh network is at least one of an IEEE 802.11a/b/g/n/ac/ad/af/ah Wi-Fi connection, a microwave connection, a Long Term Evolution (LTE) connection, a wireless connection with a frequency between 5.0 and 6.0 GHz, a wireless connection with a frequency between 2.2 and 2.5 GHz, and a wireless connection with a frequency between 20 and 65 GHz.

17. The method of claim 10 wherein the base station comprises a multi-radio access technology (multi-RAT) node.

18. A wireless backhaul resiliency system incorporating a mesh network, comprising:
a first base station utilizing a first mesh network node for a first wide area network (WAN)/backhaul connection and having a first wireless mesh functionality; and
a second base station utilizing a second mesh network node for a second WAN/backhaul connection and having a second wireless mesh functionality,
wherein the first base station is configured to detect when the first WAN/backhaul connection fails and fail over to a wireless mesh connection between the first wireless mesh functionality at the first base station and the second wireless mesh functionality at the second base station, thereby forwarding data from the first base station to a core network via the wireless mesh connection between the first mesh network node and the second mesh network node and the second WAN/backhaul connection in the event of a failure, and wherein when a wireless mesh connection between the first mesh network node and the second mesh network node is not available, then the first mesh network node directs the second mesh network node to activate the wireless mesh connection between the first mesh network node and the second mesh network node and to use this wireless mesh connection between the first mesh network node and the second mesh network node for backhaul by both of the first base station and the second base station in addition to messages between the first mesh node and the second mesh node;
wherein the first WAN/backhaul connection is a connection between the first mesh network node and a first physical network interconnect, the first physical network interconnect being in communication with the core network,
wherein the second WAN/backhaul connection is a connection between the second mesh network node and a second physical network interconnect, the second physical network interconnect being in communication with the core network and separate from the first physical network interconnect, the second physical network interconnect not being in a data path from the first base station to the core network via the first physical network interconnect;

wherein the first mesh network node is configured to fail over to the wireless mesh connection at the second mesh network node based on a geographic proximity between the first mesh network node and the second mesh network node.

19. The wireless backhaul resiliency system of claim 18 wherein the base station comprises a multi-radio access technology (multi-RAT) node.

* * * * *